United States Patent
Ghosh et al.

(10) Patent No.: US 8,046,261 B2
(45) Date of Patent: *Oct. 25, 2011

(54) EMV TRANSACTION IN MOBILE TERMINALS

(75) Inventors: Angana Ghosh, Santa Clara, CA (US); Santanu Dutta, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 912 days.

This patent is subject to a terminal disclaimer.

(21) Appl. No.: 12/037,299

(22) Filed: Feb. 26, 2008

(65) Prior Publication Data

US 2008/0147509 A1    Jun. 19, 2008

Related U.S. Application Data

(63) Continuation of application No. 10/874,903, filed on Jun. 22, 2004, now Pat. No. 7,357,309.

(51) Int. Cl.
*G06Q 20/00* (2006.01)
(52) U.S. Cl. ............... 705/17; 705/41; 705/26; 235/380
(58) Field of Classification Search .................... 705/17, 705/41, 26; 235/380
See application file for complete search history.

(56) References Cited

U.S. PATENT DOCUMENTS

| | | | |
|---|---|---|---|
| 2005/0246292 A1* | 11/2005 | Sarcanin | 705/67 |
| 2008/0040274 A1* | 2/2008 | Uzo | 705/44 |
| 2011/0035294 A1* | 2/2011 | Mizrah | 705/26.42 |
| 2011/0137797 A1* | 6/2011 | Stals et al. | 705/44 |

* cited by examiner

*Primary Examiner* — Vanel Frenel
(74) *Attorney, Agent, or Firm* — Coats & Bennett, P.L.L.C.

(57) ABSTRACT

A mobile terminal is enabled to conduct an EMV transaction. A wireless access node in the EMV card-reader terminal is provided for connecting a mobile terminal to the card-reader terminal. An EMV-proxy module executing in the card-reader terminal facilitates communication between the mobile terminal and the card-reader terminal. The EMV-proxy module lets the mobile terminal function in essentially the same way as a regular EMV chip card with respect to the card-reader terminal. The card-reader terminal may then conduct EMV transactions on behalf of the mobile terminal without requiring new software and/or hardware at the EMV issuer. EMV data is stored in the mobile terminal in the form of secure dynamic data objects. This Abstract is submitted with the understanding that it will not be used to interpret or limit the scope or meaning of the claims. 37 CFR 1.72(b).

18 Claims, 5 Drawing Sheets

FIG. 4C

EMV TRANSACTION IN MOBILE TERMINALS

CROSS-REFERENCE TO RELATED APPLICATIONS

This continuation application claims priority to U.S. patent application Ser. No. 10/874,903, filed Jun. 22, 2004, which is incorporated herein by reference which claims priority to, and hereby incorporates by reference, U.S. Provisional Application No. 60/537,112, entitled "A Proposal for Mobile EMV Transaction," filed on Jan. 16, 2004, with the U.S. Patent and Trademark Office.

FIELD OF THE INVENTION

The invention is related generally to secure credit transaction standards, and particularly to the use of such standards in a mobile terminal.

BACKGROUND

EMV is a payment system specification for credit/debit chip cards and devices designed to perform credit/debit transactions using these chip cards. The EMV specification was jointly developed and maintained by Europay International, Mastercard International, and Visa International (hence, "EMV"). The stated purpose of the EMV specification is to ensure worldwide interoperability between the chip cards and any terminal used in the credit/debit transactions. Compared to magnetic-stripe based credit/data card transactions, EMV is considered by most people to be a more secure payment system. For more information regarding the EMV specification, the reader is referred to EMV 2000 Book 1 from EMVco.

In a typical EMV transaction, there are mainly three parties involved: a buyer or user who is the cardholder, a merchant, and a bank or other financial institution that is the EMV issuer. Briefly, the buyer initiates the EMV transaction by inserting an EMV compliant chip card (or a device that uses the chip card) into an EMV payment terminal at the merchant. The payment terminal may be, for example, a Point of Sale (POS) terminal equipped with a chip card-reader and EMV access software. This payment terminal obtains the user and chip card information and sends the information to the EMV issuer to be processed. The EMV issuer processes the information and completes the EMV transaction by crediting the merchant and debiting the buyer's account accordingly. Such a transaction is called a "local" or "local environment" transaction because there is no direct connection between the chip card and the EMV issuer.

But the market uptake for the EMV specification has been fairly low. This is due, in part, to the reluctance of merchants and their POS terminal suppliers to upgrade their software and hardware infrastructure to support EMV. Recently, however, Visa Europe and Mastercard Europe have announced that beginning in January 2005, liability for transactions will shift from the card issuer to the merchant. This means that any party not EMV compliant after January 2005 will bear the liability for fraudulent transactions passing through their system that otherwise could have been prevented had EMV been supported. It is expected, therefore, that there will soon be a dramatic increase in support by merchants and POS suppliers for the EMV specification.

One way to increase market penetration for the EMV specification is to enable more devices to conduct EMV transactions. Mobile terminals in particular may help facilitate acceptance of the EMV specification because of their widespread usage and convenience factor. Examples of mobile terminals include smart-cards, mobile phones, personal digital assistants, laptop computers, and the like. Unfortunately, the currently existing EMV payment protocol was designed for use primarily in "card present" situations, such as with a card-reader. There have been attempts by various standards bodies to modify the existing EMV specification for local mobile payment transactions, but these attempts have met with little market acceptance because either the methods were cumbersome or they made little business sense.

SUMMARY OF THE INVENTION

The invention is directed to a method and system for enabling a mobile terminal to conduct an EMV transaction. The method and system of the invention includes a wireless access node in the EMV card-reader terminal for connecting a mobile terminal to the card-reader terminal. An EMV-proxy module executing in the card-reader terminal facilitates communication between the mobile terminal and the card-reader terminal. The EMV-proxy module lets the mobile terminal function in essentially the same way as a regular EMV chip card with respect to the card-reader terminal. The card-reader terminal may then conduct EMV transactions on behalf of the mobile terminal without requiring new software and/or hardware at the EMV issuer. EMV data is stored in the mobile terminal in the form of secure dynamic data objects.

In general, in one aspect, the invention is directed to a method of conducting an electronic transaction in a card-reader terminal using a mobile terminal. The method comprises the steps of establishing a wireless connection between the mobile terminal and the card-reader terminal and transferring transaction data between the mobile terminal and the card-reader terminal over the wireless connection. The method further comprises the step of hosting a proxy in the card-reader terminal to act on behalf of the mobile terminal, wherein the proxy uses the transaction data to conduct the electronic transaction on behalf of the mobile terminal.

In general, in another aspect, the invention is directed to a card-reader terminal configured to conduct an electronic transaction with a mobile terminal. The card-reader terminal comprises a wireless access node for establishing a wireless connection between the mobile terminal and the card-reader terminal, a storage unit configured to store computer readable code thereon, the computer readable code including a proxy for the mobile terminal, and a microprocessor connected to storage unit, the microprocessor capable of executing the proxy on the card-reader terminal. The proxy is configured to transfer transaction data between the mobile terminal and the card-reader terminal over the wireless connection and use the transaction data to conduct the electronic transaction on behalf of the mobile terminal.

It should be emphasized that the term comprises/comprising, when used in this specification, is taken to specify the presence of stated features, integers, steps, or components, but does not preclude the presence or addition of one or more other features, integers, steps, components, or groups thereof.

BRIEF DESCRIPTION OF THE DRAWINGS

The foregoing and other advantages of the invention will become apparent from the following detailed description and upon reference to the drawings, wherein.

DETAILED DESCRIPTION OF EXEMPLARY EMBODIMENTS

Embodiments of the invention provide a system and method for enabling a mobile terminal to conduct an EMV transaction. Such mobile terminals will be referred to hereinafter as personal trusted device (PTD) and may include smart-cards, mobile phones, personal digital assistants, laptop computers, and the like. In addition, EMV transactions using a personal trusted device according to embodiments of the invention will be referred to hereinafter as mobile-EMV, whereas EMV transactions involving regular integrated chip cards (ICC) will be referred to hereinafter as ICC-EMV. Also, the software and/or hardware used by the card issuer banks or other financial institution to process the EMV transactions will be referred to hereinafter as the EMV issuer back office.

Figure 1:
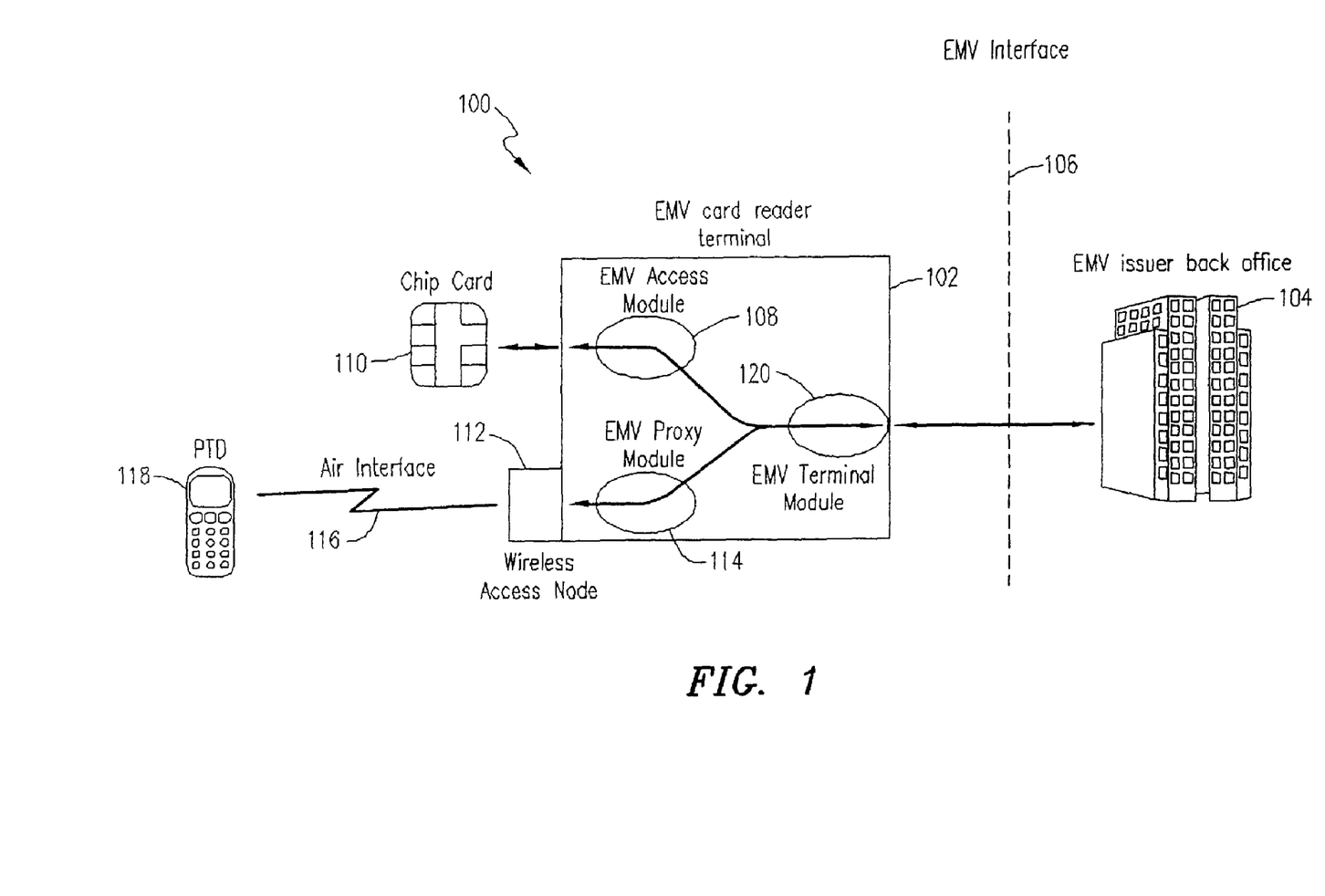
FIG. 1 illustrates a model 100 of an exemplary EMV implementation according to embodiments of the invention.

FIG. 1 shows a conceptual model 100 of one exemplary EMV implementation according to embodiments of the invention. The model 100 includes an EMV card-reader terminal 102 that is connected to and communicates with an EMV issuer back office 104 over an EMV interface 106. The EMV issuer back office 104, the EMV interface 106, and the various support structures therefor are well-known to persons having ordinary skill in the art and will not be described here. The EMV card-reader terminal 102, on the other hand, is a new EMV card-reader terminal 102 that is capable of handling both regular ICC-EMV transactions as well as new mobile-EMV transactions. To this end, the EMV card-reader terminal 102 includes well-known data processing and program execution capability as well as data and program storage capability (e.g., microprocessors, memory, storage unit, display, input/output unit, etc.).

To handle the regular ICC-EMV transactions, the EMV card-reader terminal 102 is equipped with a physical card-reader (not expressly shown) and an EMV access module 108 for operating the physical card-reader. The physical card-reader basically provides a hardware interface (i.e., a physical connection) between the EMV card-reader terminal 102 and an EMV chip card 110. The EMV access module 108, on the other hand, executes the data transfer protocol (i.e., an electronic handshake) between the EMV chip card 110 and the EMV card-reader terminal 102. The physical card-reader and the EMV access module 108 are both well-known to persons having ordinary skill in the art and will not be described here.

To handle the new mobile-EMV transactions, in accordance with embodiments invention, the EMV card-reader terminal 102 is further equipped with a wireless access node 112 and an EMV-proxy module 114. The wireless access node 112 basically provides an air interface 116 between a personal trusted device 118 and the EMV card-reader terminal 102. The EMV-proxy module 114 executes the data transfer protocol between the personal trusted device 118 and the EMV card-reader terminal 102. In some embodiments, the wireless access node 112 may be a secure short-range wireless access node 112 that is based on, for example, the Bluetooth wireless protocol. For more information regarding the Bluetooth wireless protocol, the reader is referred to www-.bluetooth.com. Other types of wireless interfaces (e.g., infrared (IR), near field communications (NFC)) may also be used without departing from the scope of the invention.

Both the EMV access module 108 and the EMV-proxy module 114 are linked to an EMV terminal module 120 running in the EMV card-reader terminal 102. The function of the EMV terminal module 120 is to implement the EMV specification that controls how an EMV transaction is conducted. Thus, for example, the EMV terminal module 120 may request certain types of data from the personal trusted device 118 or the EMV chip card 110 that are needed to conduct the EMV transaction, such as user identification, payment authorization, and the like. Since the EMV terminal module 120 does not need to know which communication protocol the personal trusted device 118 or the EMV chip card 110 is using, the actual exchange of data between the EMV terminal module 120 and the personal trusted device 118 or the EMV chip card 110 may be carried out through the EMV-proxy module 114 and the EMV access module 108 using any suitable protocol. The data obtained by the EMV terminal module 120 is then forwarded to the EMV issuer back office 104 over the EMV interface 106 to complete the EMV transaction. In this way, no change is needed in the EMV issuer back office 104 to accommodate the personal trusted device 118 and, hence, the existing EMV issuer back office 104 software/hardware may be preserved. In some embodiments, however, some changes may be made to the EMV issuer back office 104 in order to optimize the EMV transaction.

Note that, although the EMV access module 108, the EMV-proxy module 114, and the EMV terminal module 120 are shown here as separate modules, persons having ordinary skill in the art will understand that all three modules may be combined into a single software package running on the EMV card-reader terminal 102.

As mentioned above, one of the tasks of the EMV-proxy module 114 is to execute the communication protocol between the personal trusted device 118 and the EMV card-reader terminal 102. One aspect of this task is to ensure user authentication. That is, the EMV-proxy module 114 should be able to verify that the identification provided by the user matches the identification stored in the personal trusted device 118. Preferably, the communication protocol executed by the EMV-proxy module 114 has one or more functions built-in specifically for verifying the identity of the user. An example of such a communication protocol is the Mobile electronic Transaction (MeT) standard promulgated by MeT Limited (www.mobiletransactions.org). Specifically, the MeT standard has several core authorization functions, including the WMLScript, the ECMAScript, and the crypto signText( ) functions. For more information regarding the MeT standard, the reader is referred to latest version of the MeT Core Specification from MeT Limited. In accordance with embodiments of the invention, the EMV-proxy module 114 may employ these well-known authorization functions to authenticate the user as well as to capture payment authorization.

Another aspect of the EMV-proxy module 114 is to ensure security for user data because once the user is verified, confidential user data may be transferred between the personal trusted device 118 and the EMV-proxy module 114. In some embodiments, security for the confidential user data may be accomplished by using secure data objects to transfer the data. Preferably, the data objects are dynamic so that the data may be modified as needed in accordance with the EMV specification. An example of such a secure dynamic data 204 object is the MeT-ticket used in the MeT Ticketing Secure Handling Framework, as specified in the MeT Ticketing Specification from MeT Limited. In accordance with embodiments of the invention, the EMV-proxy module 114 may employ these well-known MeT-tickets to transfer confidential user data between the personal trusted device 118 and the EMV-proxy module 114.

Note that it is not necessary to verify the identity of the EMV card-reader terminal 102, since the terminal 102 is designed to be tamper-resistant and is therefore implicitly trusted by the EMV issuer back office 104. It is recommended, however, that the identity of the EMV-proxy module 114 should at least be verified before transferring confidential user data thereto. In some embodiments, the identity of the EMV-proxy module 114 may be verified by setting up a WTLS/TLS Class 2 connection. Then, after successful authentication of both the user and the EMV-proxy module 114, the EMV-proxy module 114 can initiate a normal EMV transaction with the merchant (EMV card-reader terminal 102) and the EMV issuer on behalf of the user.

Figure 2:
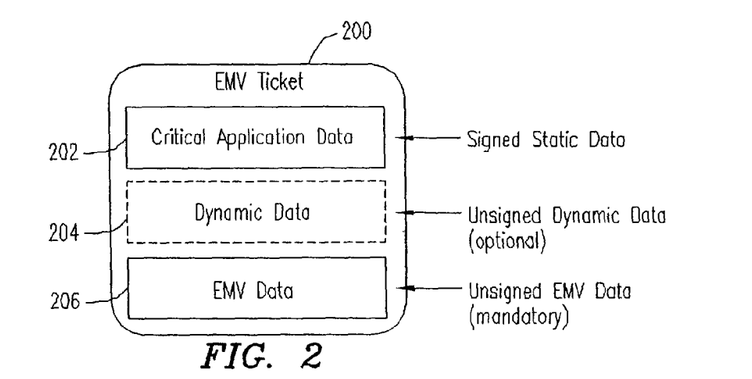
FIG. 2 illustrates an exemplary data object according to embodiments of the invention.

In order for the EMV issuer back office 104 to process any EMV transaction, a cardholder account must first be created. Creation of the cardholder account involves the following steps: generation and provisioning of an EMV service certificate, generation and provisioning of an EMV-ticket 200, and generation and provisioning of EMV symmetric key. These steps are described below with regard to how they are presently performed in the ICC-EMV in order to explain how they may be performed in the mobile-EMV.

With respect to the generating and provisioning of the EMV service certificate, in some embodiments, the generation and provisioning of the EMV service certificate may be accomplished using a process similar to the MeT certificate registration process, described in the MeT Core Specification. The service certificate, or a URL of the service certificate, may then be stored in the personal trusted device 118. For more information regarding the process of setting up an MeT service certificate, the reader is referred to the MeT CUE Specification from MeT Limited.

Generation and provisioning of the EMV-ticket 200 can be accomplished as follows. Regular integrated chip cards 110 store certain items of user-specific data, part of which is static data 202 that is signed as well as unsigned, and part of which is dynamic data 204 that is updated during an EMV transaction. In mobile-EMV, this data may be stored in a secure data object in the personal trusted device 118. In some embodiments, the data object may be an electronic ticket, such as an EMV-ticket 200. The EMV-ticket 200 is issued by the EMV issuer and may be securely provisioned in the personal trusted device 118. The provisioning may be achieved by a physical interface, or it may be done over an air interface 116. As mentioned above, the EMV-ticket 200 may be an MeT-ticket that conforms to the MeT Ticketing Specification from MeT Limited. The ticketing framework for secure handling of stored data objects, including copy protection against both malicious personal trusted device 118 owners and third party eavesdroppers, may be the MeT Ticketing Secure Handling Framework currently being developed by MeT Limited.

Other implementations of a secure ticket handling system may also be used, such as the ones described in U.S. patent application Ser. No. 10/008,174, entitled "A Proposal for Secure Handling for Stored Value Electronic Tickets," by Nils Rydbeck and Santanu Dutta, filed Nov. 13, 2001, and Continuation-in-Part application Ser. No. 10/103,502 by Santanu Dutta, filed Mar. 21, 2002. Both of these applications are incorporated herein by reference.

FIG. 2 illustrates the data structure of an EMV-ticket 200 according embodiments of the invention. Such an EMV-ticket 200 may be generated by the EMV issuer and transferred to the personal trusted device 118 at the time of cardholder account creation/registration. As can be seen, the EMV-ticket 200 data structure includes signed static data 202, unsigned dynamic data 204, and unsigned EMV data 206. In some embodiments, the unsigned dynamic data 204 in the EMV-ticket 200 may be optional. In most embodiments, the unsigned EMV data 206 is mandatory.

With respect to the signed static data 202, by way of explanation, in ICC-EMV, static data 202 authentication is performed by the card-reader terminal 102. The static data 202 is signed by the EMV issuer's private key and the card-reader terminal 102 uses a digital signature scheme based on public key encryption techniques to confirm the legitimacy of the ICC-resident static data 202. This arrangement allows detection of unauthorized alteration of data after personalization. For more information regarding static data 202 authentication in ICC-EMV, the reader is referred to the EMV specification, EMV 2000 Book 2, from EMVco.

Similarly, for mobile-EMV, the EMV-ticket 200 may also contain the EMV signed static data 202 mentioned above. The signed static data 202 may also contain the EMV issuer's public key (contained in the certificate) corresponding to the EMV issuer's private key that was used to generate the signature on the static data 202. The EMV card-reader terminal 102 may use this certificate to verify the signature of the static data 202. As in the case of ICC-EMV, the EMV card-reader terminal 102 may contain the Public Key Certificate Authority (CA) root certificate to which the EMV issuer's public key is connected.

In some embodiments, the type of data included in the signed static data 202 includes application data. An example of such application data may be the Application Interchange Profile (AIP), which specifies the application functions supported by the ICC. Thus, some of the information contained in the AIP determines whether: offline static data 202 authentication is supported, offline dynamic data 204 authentication is supported, cardholder verification is supported, terminal risk management needs to be performed, and EMV issuer authentication is supported. A more complete list of API is available at EMV 2000 Book 3, Annex C.1, Page 90, from EMVco.

For unsigned dynamic data 204, such as program counters and the like, it is useful to understand that, presently, EMV transactions can be completed offline or online. Offline means that the EMV card-reader terminal 102 does not need to connect to an EMV issuer to receive transaction authorization, whereas online means that the EMV card-reader terminal 102 must connect to an EMV issuer for transaction authorization. When an EMV transaction is completed online, the EMV issuer may provide command scripts to the EMV card-reader terminal 102 be delivered to the integrated chip card 110. The command scripts perform functions that are not necessarily relevant to the current transaction, but are important for the continued functioning of the application in the integrated chip card 110. Command script processing is provided to allow for functions that are outside the scope of the EMV specification and may be done differently by various issuers or payment systems. Examples of such functions may include unblocking of offline PIN, update of transaction counters, and so on.

In accordance with embodiments of the invention, mobile-EMV also provides for dynamic updates of data. The dynamic data 204 part of the EMV-ticket 200 may contain, for example, data that needs to be updated by the EMV issuer after the completion of an EMV transaction. Thus, when the transaction is completed online, the EMV issuer may send a command script for updating the data to the EMV-proxy. Since the EMV-proxy possesses the user's EMV-ticket 200, it may update the dynamic data 204 in the EMV-ticket 200. The dynamic data 204 in the EMV-ticket 200, however, is not signed, as in the case of an ICC-EMV transaction.

With unsigned EMV data 206, presently, ICC-EMV requires certain information, both mandatory and optional, to be stored in the integrated chip card 110. Tables 1 through 3 below show examples of the type of data that needs to be present in the integrated chip card 110 according to the EMV specification. With mobile-EMV, however, this data (i.e., the data contained in Tables 1 through 3) may be stored instead in the EMV-ticket 200 in the personal trusted device 118.

TABLE 1

| Tag | Value | Presence |
| --- | --- | --- |
| '5F24' | Application Expiration Date | M |
| '5A' | Application Primary Account Number (PAN) | M |
| '8C' | Card Risk Management Data Object List 1 | M |
| '8D' | Card Risk Management Data Object List 2 | M |

Table 1 lists the data objects that must be present in the integrated chip card 110 in certain files that are read using the READ RECORD command. All other data objects defined in the EMV specification to be resident in these files are optional. In order to store these same data objects in the EMV-ticket 200 of the personal trusted device 118, protective measures must be taken to prevent them from being altered or misused. Therefore, in some embodiments of the invention, none of the data objects in Table 1 are exposed for user viewing. In another approach, the data objects in Table 1 (or the sensitive portions thereof) may be encrypted so that the user is only able to see a label identifying the EMV-ticket 200. In a preferred embodiment, sensitive data, whether encrypted or not, is not displayed to the user.

Table 2 below lists the data objects required for offline static data 202 authentication (see, e.g., EMV 2000 Book 3, page 30). This data normally needs to be present to support offline dynamic data 204 authentication (see, e.g., EMV 2000 Book 3, page 31). However, in some embodiments of the invention, the personal trusted device 118 may omit the function of offline dynamic data 204 authentication. Therefore, in these embodiments, the data objects in Table 2 are not stored in the personal trusted device 118.

TABLE 2

| Tag | Value |
| --- | --- |
| '8F' | Certification Authority Public Key Index |
| '90' | EMV issuer Public Key Certificate |
| '93' | Signed Static Application Data |
| '92' | EMV issuer Public Key Remainder |
| '9F32' | EMV issuer Public Key Exponent |

Table 3 below lists the data objects that are retrievable by the EMV card-reader terminal 102 using the GET DATA command and not the READ RECORD command.

TABLE 3

| Tag | Value | Presence |
| --- | --- | --- |
| '9F36' | Application Transaction Counter (ATC) | M |
| '9F17' | PIN try counter | O |
| '9F13' | Last online ATC Register | O |

In general, the presence of critical information in the EMV-ticket 200 requires secure handling, storage and copy protection during transmission from the EMV issuer 104 to the personal trusted device 118, from the personal trusted device 118 to the EMV-proxy 114 and from the EMV-proxy 114 back to the personal trusted device 118. Therefore, in accordance with embodiments of the invention, the personal trusted device 118 may carry (a) an EMV-specific service certificate from the EMV issuer, and (b) the EMV data 206 object as described with respect to the EMV-ticket 200 above. However, the personal trusted device 118 is not required to carry the full EMV application as required by the EMV specification, since the functions performed by the application have been delegated to the EMV-proxy.

As for provisioning of the EMV-ticket 200, various mechanisms may be used to transfer the EMV-ticket 200 from the EMV issuer 104 to the personal trusted device 118. These mechanisms may include: download by inserting the personal trusted device 118 in docking station at the EMV issuer's physical facilities; download via local wireless channels (e.g., Bluetooth, infrared) in the EMV issuer's physical facilities; given to the user in the form of a smart-card (contactless or otherwise); and over-the-air (OTA) download using the MeT ticketing download framework (see, e.g., the MeT Ticketing Specification from MeT Limited). After successful download, the EMV-ticket 200 may be stored in the ticket database as described in the MeT Ticketing Specification, and the MeT-ticket database may be stored inside a secure wallet in the personal trusted device 118.

Finally, with regard to generation and provisioning of the EMV symmetric key, in an ICC-EMV transaction, a symmetric key is stored in the integrated chip card 110. The symmetric key is then used to generate EMV application cryptograms that include a Message Authentication Code (MAC). The MAC is basically a one-way hash function with the addition of a secret key. The hash value is a function of both the data and the key and only someone with the key can verify the hash value. In mobile-EMV, the EMV symmetric key may be generated by the EMV issuer and delivered to the personal trusted device 118 for storage and subsequent generation of the EMV application cryptograms. In some embodiments, the EMV issuer delivers the EMV symmetric key to the personal trusted device 118 embedded inside an EMV-ticket 200.

In other embodiments, the symmetric key may be encrypted and delivered to the personal trusted device 118 during an over-the-air (OTA) delivery. During OTA delivery, the EMV symmetric key embedded in the EMV-ticket 200 may be encrypted using the user's public key. Then, only the user's private key can decrypt the EMV symmetric key. Several ways exist by which the EMV issuer may obtain the user's public key.

Local transfer of EMV-ticket 200 containing the EMV symmetric key may also be possible, in which case, depending on the bearer transferring the key, encryption may not be required.

Figure 3:
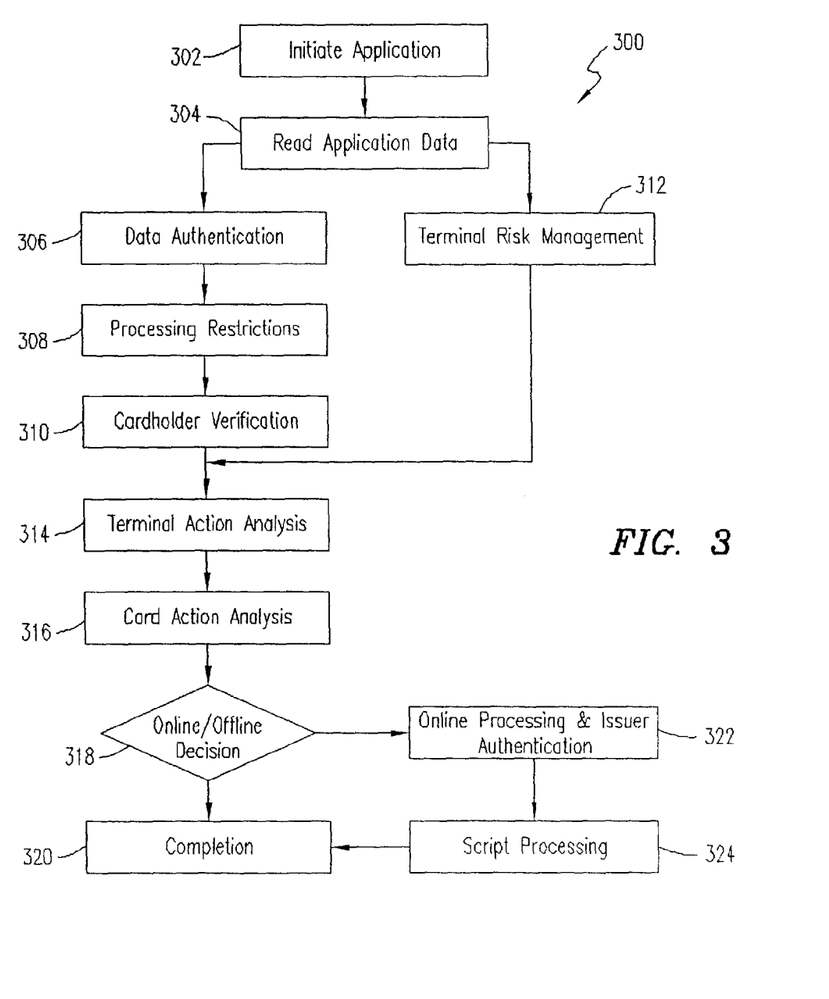
FIG. 3 illustrates a flow chart for a regular EMV transaction that may also be used for the EMV transaction according to embodiments of the invention.

FIG. 3 illustrates a basic flow 300 for a typical ICC-EMV transaction, as specified by the EMV Specification. The mobile-EMV transaction follows similar steps and, therefore, the flow 300 is provided here as an example of these steps. The flow 300 assumes that the integrated chip card/personal trusted device has already connected to the EMV card-reader terminal, for example, by a physical interface. As can be seen, the transaction begins at step 302, where the integrated chip card/personal trusted device initiates an application, such as a payment application. At step 304, the integrated chip card/personal trusted device reads the data for the application from the data stored in the EMV-Ticket. At step 306, the integrated chip card/personal trusted device authenticates the data for the application. Any restrictions on the transaction are processed at step 308. At step 310, the cardholder/user is verified. In parallel with steps 306-310, the integrated chip card/personal trusted device also performs a terminal risk management at step 312. Terminal risk management protects the acquirer, issuer and the whole system from fraud. It provides positive issuer authorization for high-value transactions and ensures that EMV transactions go online periodically to protect against threats that may be undetectable in an offline environment.

Next, the integrated chip card/personal trusted device performs a terminal action analysis at step 314. During terminal action analysis, the cardholder system in ICC-EMV requires an online authorization of the transaction. The card determines whether to decline the transaction offline or to request an online authorization. At step 316, the integrated chip card/personal trusted device performs a card action analysis. Card action analysis is outside the scope of the EMV specification and will therefore not be described here. A determination is made at step 318 whether the transaction is online or offline. If the transaction is an offline transaction, then the integrated chip card/personal trusted device concludes the transaction at step 320. On the other hand, if the transaction is an online transaction, then at step 322, the integrated chip card/personal trusted device sends the data for the transaction to the EMV issuer back office (via the EMV card-reader terminal). At step 324, command scripts from the EMV issuer back office are processed by the integrated-chip card/personal trusted device. Thereafter, the transaction is concluded at step 320.

Figure 4A:
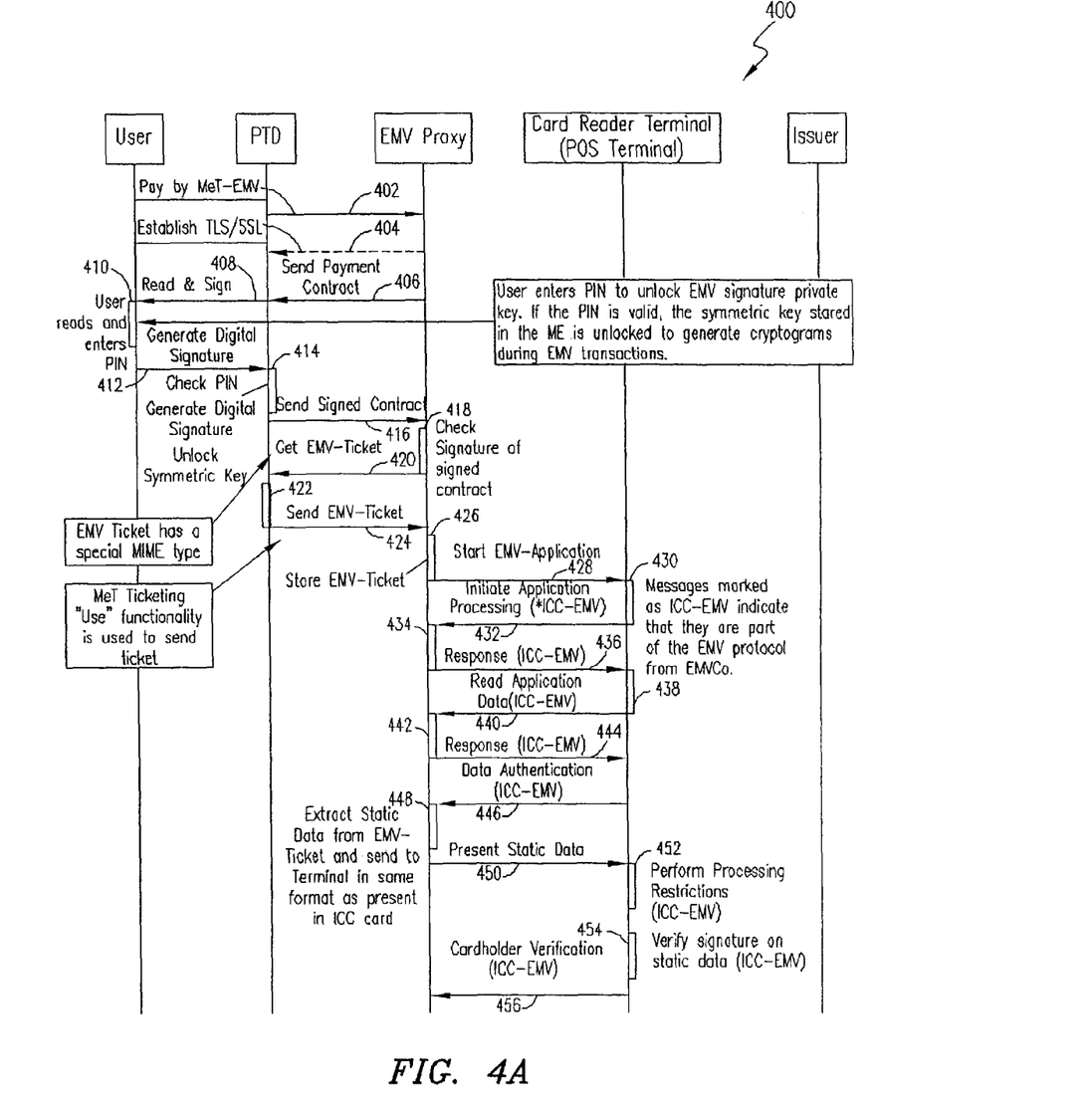
FIGS. 4A-4C illustrate a timing diagram for an exemplary EMV transaction according to embodiments of the invention.
Figure 4B:
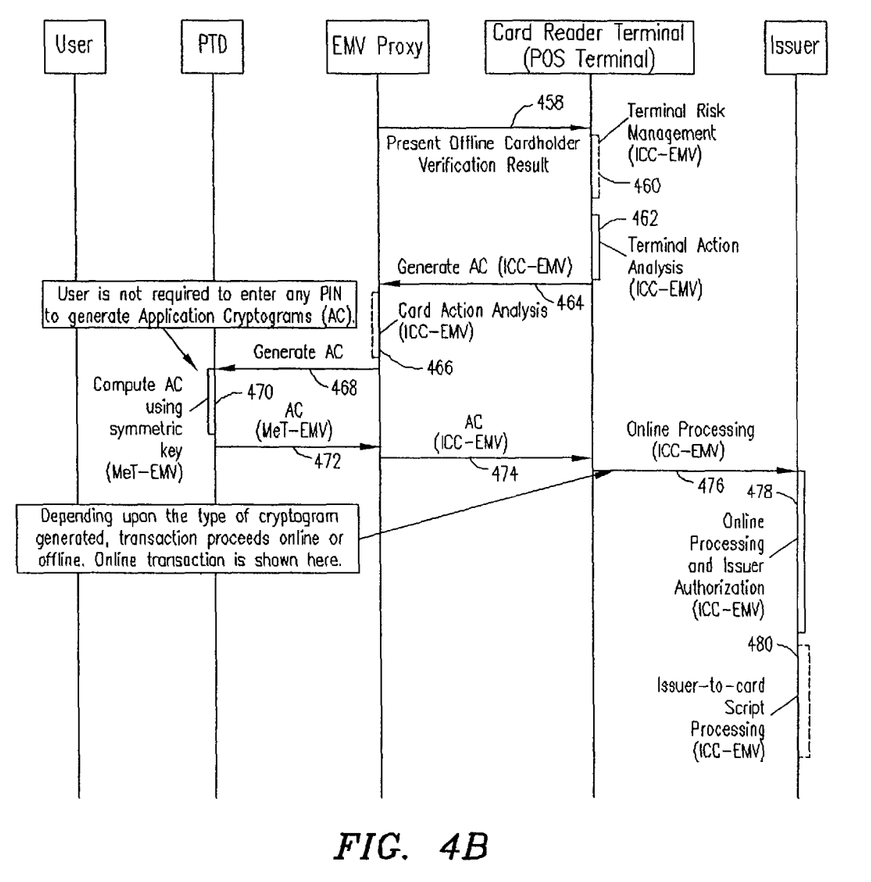
Figure 4C:
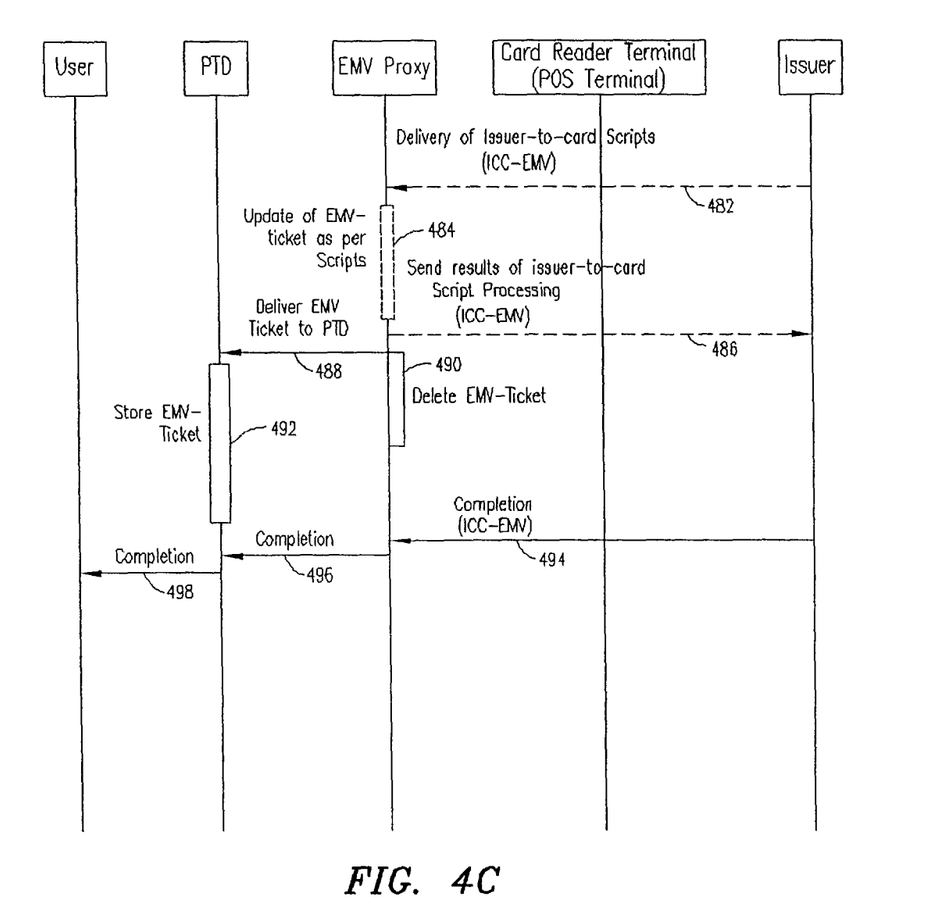

FIGS. 4A-4C illustrate a timing diagram 400 for an exemplary mobile-EMV transaction according to embodiments of the invention. Where the timing diagram 400 employs steps that are the same as or similar to the existing steps in an ICC-EMV transaction, an "(ICC-EMV)" designator will be used to indicate the similarity. Also, throughout FIGS. 4A-4C, dashed lines are used to indicate optional steps or actions, whereas solid lines are used to indicate mandatory steps or actions.

As can be seen, the mobile-EMV transaction begins at step 402, where the user, through his personal trusted device, indicates to the EMV-proxy module in the EMV card-reader terminal that he wishes to make a MeT-EMV payment. At step 404, the EMV-proxy module and the personal trusted device establish a secure wireless connection (e.g., a TLS/SSL connection) therebetween. At step 406, the EMV-proxy module passes the payment contract to the personal trusted device. At step 408, the personal trusted device presents (e.g., displays) the payment contract to the user. At step 410, the user reads the payment contract and, at step 412, he enters his personal identification number (PIN) to indicate his acceptance of the payment contract. By entering his PIN, the user unlocks his EMV signature private key. If the PIN is valid, the symmetric key stored in the personal trusted device is unlocked and used to generate cryptograms during the EMV transaction.

At step 414, the personal trusted device checks the PIN and, if the PIN is valid, generates a digital signature and unlocks the symmetric key. At step 416, the personal trusted device sends the signed payment contract to the EMV-proxy module. At step 418, the EMV-proxy module checks the signature of the signed payment contract. If the EMV-proxy module determines that the signature on the signed payment contract is valid, then at step 420, the EMV-proxy module requests an EMV-ticket, which has a special MIME type, from the personal trust device. At step 422, the personal trusted device retrieves the EMV-ticket and sends the EMV-ticket at step 424 to the EMV-proxy module. At step 426, the EMV-proxy module stores the EMV-ticket at the proxy and, at step 428, initiates an EMV transaction with the EMV card-reader terminal module.

At step 430, the EMV card-reader terminal module initiates a corresponding EMV application and, at step 432, it sends an acknowledgment to the EMV-proxy module. At step 434, the EMV-proxy module receives the acknowledgment and sends an appropriate response at step 436. At step 438, the EMV card-reader terminal module processes the response from the EMV-proxy module and, at step 440, the EMV card-reader terminal sends a request for application data to the EMV-proxy module. At step 442, the EMV-proxy module reads the application data stored in the EMV-ticket and sends an appropriate response at step 444 to the EMV card-reader terminal module. At step 446, the EMV card-reader terminal module requests authentication of the application data from the EMV-proxy module. At step 448, the EMV-proxy module reads the application data from the static data portion of the EMV-ticket and, at step 450, sends the application data to the EMV card-reader terminal module. At step 452, the EMV card-reader terminal module processes any restrictions on the user based on the application data. At step 454, the EMV card-reader terminal module verifies the signature of the static data and, at step 456, sends an appropriate confirmation of the verification.

At step 458, the EMV-proxy module presents the cardholder verification results to the EMV card-reader terminal module. Thus far, only an offline verification has been performed. At step 460, the EMV card-reader terminal module performs a terminal risk management and, at step 462, performs a terminal action analysis. A new Application Cryptogram (AC) is generated by the EMV card-reader terminal module at step 464 and sent to the EMV-proxy module. At step 466, the EMV-proxy module performs a card action analysis and generates a new AC, which is forwarded to the personal trusted device at step 468. At step 470, the personal trusted device computes its own AC using the symmetric key and, at step 472, sends this AC to the EMV-proxy module. At step 474, the EMV-proxy module forwards the AC to the EMV card-reader terminal module, which in turn may forward the AC to the EMV issuer back office, depending on whether the transaction is an online transaction or an offline transaction. In the example shown here, the transaction is an online transaction based on the type of cryptograms generated. At step 476, the EMV card-reader terminal module forwards the AC to the EMV issuer back office.

At step 478, the EMV issuer back office processes the online transaction and issues an authorization for the transaction. At step 480, the EMV issuer back office may generate a command script for the personal trusted device. At step 482, the EMV issuer back office delivers the command script to the EMV-proxy module (via the EMV card-reader general model 100). The EMV-proxy module updates its copy of the EMV-ticket in accordance with the command script at step 484, and sends the result of the command script processing to the EMV issuer back office at step 486. Thereafter, the EMV-proxy module sends the updated EMV-ticket to the personal trusted device at step 488 and deletes its copy of the same at step 490. The EMV issuer back office, upon receiving confirmation of command script processing, sends a completion message to the EMV-proxy module at step 494 (via the EMV card-reader terminal module). The EMV-proxy module, in turn, sends a completion message to the personal trusted device at step 496, where it is presented to the user at step 498.

Generation of the application cryptograms was mentioned previously and may be implemented as follows. As has been mentioned above, a symmetric key stored in the EMV chip card is used to generate the application cryptograms in an ICC-EMV transaction. The following Table 4, as specified by the EMV specification, provides the recommended minimum set of data elements for the application cryptogram generation. The algorithm used for the generation of the application cryptograms in ICC-EMV has been provided in EMV 2000 Book 2. In some embodiments, mobile-EMV may use the same algorithm for generation of the application cryptograms.

TABLE 4

| Value | Source |
|---|---|
| Amount, Authorised | Terminal |
| Amount Other (Numeric) | Terminal |
| Terminal Country Code | Terminal |
| Terminal Verification Results | Terminal |
| Transaction Currency Code | Terminal |
| Transaction Date | Terminal |
| Transaction Type | Terminal |
| Unpredictable Number | Terminal |
| Application Interchange profile | ICC |
| Application Transaction Counter | ICC |

Accordingly, the EMV symmetric key may either be (a) transferred to the EMV-proxy from the personal trusted device to have the EMV-proxy generate the cryptograms on behalf of the user, or (b) stored in the personal trusted device where the cryptograms will be generated. Option (a) requires a sufficient amount of trust to be placed on the EMV-proxy as well as on the mechanism to securely transfer the EMV symmetric key from the personal trusted device to the EMV-proxy, making it a higher risk approach if such trust is lacking. For this reason, option (b) (i.e. the EMV symmetric key stays in the personal trusted device) is preferred in some embodiments of the invention.

The symmetric key, in ICC-EMV, is provisioned by the EMV issuer back office into the integrated chip card at the time of manufacturing of the card. In the mobile-EMV architecture, from a security point of view, the most logical place to store the EMV symmetric key would be the SE. However, the current Wireless Identity Module (WIM), developed by WAP for and maintained by the open Mobile Alliance specification, does not support symmetric key operations. Moreover, there may be business and technical issues related to post-issuance provisioning of the EMV symmetric keys into the SWIM card, which is a combination of a SIM card plus a WIM card. Nevertheless, in accordance with embodiments of the invention, the symmetric key storage place may be any of the mentioned places (e.g., smart-card, mobile equipment, etc.), as explained below.

In some embodiments, the concept of a security lock-box can be used for storage of EMV symmetric key and generation of EMV application cryptograms. Such a security lock-box is referred to here as a Sym-Locker (Symmetric Key Locker). A Sym-Locker may either be implemented in a smart-card based security element (i.e., the SWIM card), a smart-card without a security element, such as a standard SIM card (the SIM card provides symmetric key functionality), or in the card-reader terminal hardware. Regardless of how it is implemented, following are some of the requirements of the Sym-Locker.

Sym-Locker should provide APIs for secure provisioning of the EMV symmetric key into the locker. The API needs to allow provisioning of the symmetric key post issuance of the smart-card or the personal trusted device, depending on where the Sym-Locker is implemented. Also, the symmetric key needs to be securely stored in such a way that is sufficiently difficult to retrieve, tamper with, or copy the key. Further, the EMV symmetric key should never leave the Sym-Locker. EMV application cryptograms should be generated inside the Sym-Locker. The Sym-Locker should provide APIs to enable generation of the EMV cryptograms.

Users should not be asked to authenticate to the Sym-Locker in addition to the authentication to the EMV-proxy module because it would be unnecessary and may result in a degraded user experience. The Sym-Locker should be able to use the result of the user's authentication to the EMV-proxy module in order to generate and release the cryptogram for the mobile-EMV transaction. The Sym-Locker should be able to hold multiple EMV symmetric keys, each key corresponding to a separate integrated chip card issued by one or more financial institutions. Users may not browse the contents of the Sym-Locker keys. The EMV-tickets will provide an indication that the user was received at one or more financial institutions. Finally, the Sym-Locker should provide provisions to delete EMV Symmetric keys stored in the locker.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting an electronic transaction between a mobile terminal and a remote party using a point of sale terminal, comprising:
   hosting a proxy module in the point of sale terminal to act on behalf of the mobile terminal;
   establishing a wireless connection between the mobile terminal and the proxy module;
   authenticating a user of the mobile terminal to the proxy module; and
   conducting an electronic transaction between the mobile terminal and the remote party using said proxy module as an intermediary.

2. The method according to claim 1, wherein the electronic transaction is a Europay, Mastercard, and Visa (EMV) transaction.

3. The method according to claim 1, where in the step of authenticating a user to the proxy module involves executing one or more Mobile electronic Transaction (MeT) authentication functions.

4. The method according to claim 1, further comprising setting up symmetric keys for the mobile terminal to be used in transferring transaction data between the mobile terminal and the point of sale terminal.

5. The method according to claim 4, wherein transferring the transaction data comprises transferring secure dynamic data objects.

6. The method according to claim 5, wherein the secure dynamic data objects include Mobile electronic Transaction (MeT) tickets.

7. The method according to claim 5, further comprising updating the secure dynamic data objects upon completion of the electronic transaction.

8. The method according to claim 1, wherein the step of establishing a wireless connection comprises establishing a Bluetooth wireless connection.

9. The method according to claim 1, wherein the remote party comprises a financial institution, and wherein no changes were made at the financial institution to accommodate the mobile terminal.

10. A point of sale terminal configured to conduct an electronic transaction between a mobile terminal and a remote party, said point of sale terminal comprising:
   a wireless access node for establishing a wireless connection between the mobile terminal and the point of sale terminal; and
   a proxy module configured to authenticate a user of the mobile terminal and further configured to operate as an intermediary between the mobile terminal and the remote party to conduct the electronic transaction.

11. The point of sale terminal according to claim 10, wherein the electronic transaction is a Europay, Mastercard, and Visa (EMV) transaction.

12. The point of sale terminal according to claim 10, wherein the proxy module authenticates the user by executing one or more Mobile electronic Transaction (MeT) authentication functions.

13. The point of sale terminal according to claim 10, wherein the proxy module is further configured to transfer secure dynamic data objects between the mobile terminal and the point of sale terminal, wherein the proxy module conducts the electronic transaction based on the secure dynamic data objects.

14. The point of sale terminal according to claim 13, wherein the proxy module transfers secure dynamic objects by transferring Mobile electronic Transaction (MeT) tickets.

15. The point of sale terminal according to claim 14, wherein the proxy module is further configured to update the secure dynamic data objects upon completion of the electronic transaction.

16. The point of sale terminal according to claim 10, wherein the wireless access node comprises a Bluetooth wireless access node.

17. The point of sale terminal according to claim 10, wherein the remote party comprises a remote financial institution, the point of sale terminal further configured to execute computer readable code configured to connect the proxy module to the financial institution on behalf of the mobile terminal.

18. The point of sale terminal according to claim 17, wherein no changes were made at the financial institution to accommodate the mobile terminal.

* * * * *

UNITED STATES PATENT AND TRADEMARK OFFICE
CERTIFICATE OF CORRECTION

PATENT NO.       : 8,046,261 B2                              Page 1 of 1
APPLICATION NO.  : 12/037299
DATED            : October 25, 2011
INVENTOR(S)      : Ghosh et al.

It is certified that error appears in the above-identified patent and that said Letters Patent is hereby corrected as shown below:

On the Title Page, item (57), under "ABSTRACT", in Column 2, Lines 13-15, delete "This Abstract................1.72(b).".

In Column 12, Line 48, in Claim 3, delete "where in" and insert -- wherein --, therefor.

Signed and Sealed this
Twenty-fourth Day of April, 2012

David J. Kappos
*Director of the United States Patent and Trademark Office*